Figure 7:
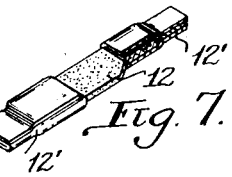

Nov. 20, 1934.  H. A. SNOW  1,981,336
VACUUM DEVICE
Filed Sept. 15, 1928   2 Sheets-Sheet 1
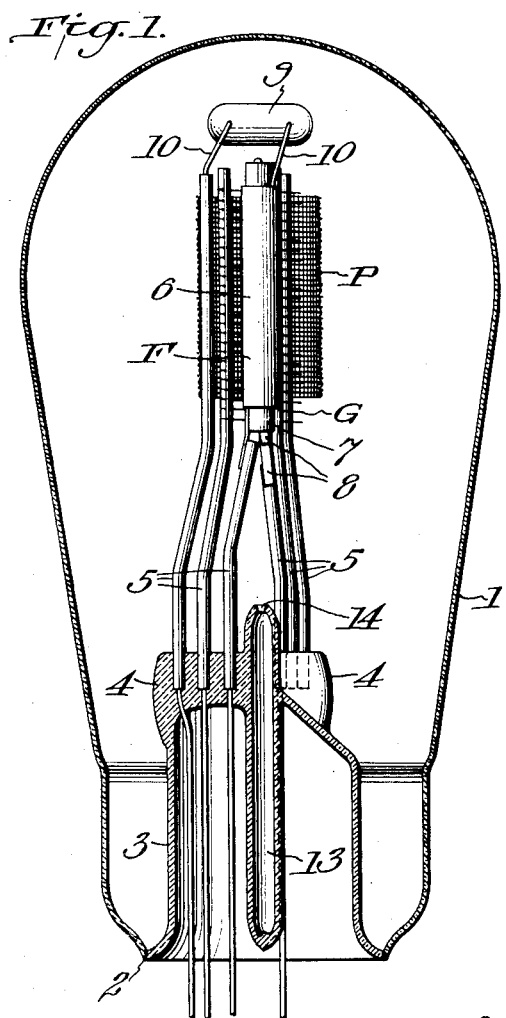
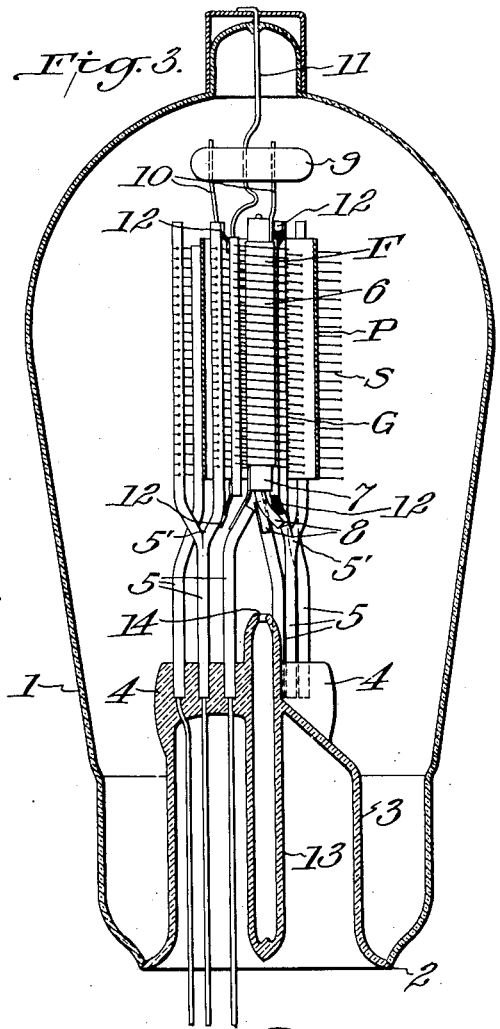
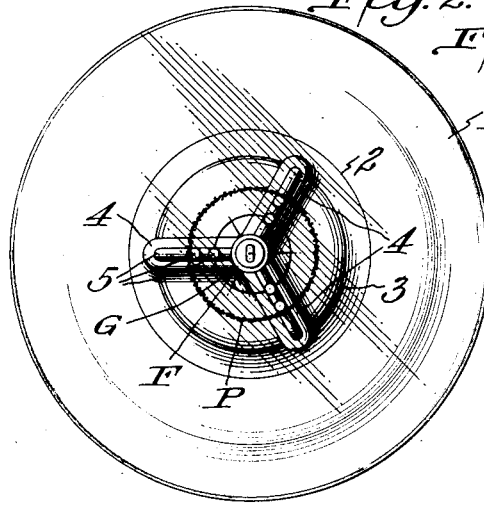
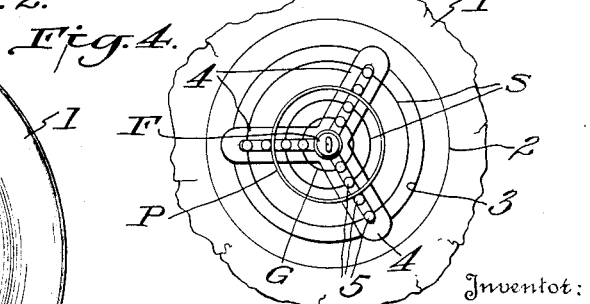
Inventor:
Harold A. Snow,
Attorney Nov. 20, 1934.  H. A. SNOW  1,981,336
VACUUM DEVICE
Filed Sept. 15, 1928   2 Sheets-Sheet 2

Inventor:
Harold A. Snow,
By Byrnes Townsend & Brickenstein
Attorneys

Patented Nov. 20, 1934

1,981,336

UNITED STATES PATENT OFFICE 1,981,336

VACUUM DEVICE

Harold A. Snow, Boonton, N. J., assignor, by mesne assignments, to Radio Corporation of America, New York, N. Y., a corporation of Delaware Application September 15, 1928, Serial No. 306,204

1 Claim. (Cl. 250—27.5)

This invention relates to a vacuum device or vacuum tube such as a rectifier tube, an audion tube, or the like. It has for its object to provide a novel arrangement and construction for such a device, this construction being stronger and more rigid than the present constructions. A further object is to provide an improved construction and means for supporting the elements of such a device. A still further object is to provide an improved means of connecting the elements of such a device. Other objects of this invention will appear from the following description.

For many reasons it is desirable to provide as much strength and rigidity as possible in the construction of a vacuum device of this character. For example, it has been found that certain noises which are heard in radio systems (so-called "microphonic" noises) are due to vibrations of the elements of audion tubes (triodes or tetrodes) employed therein. These vibrations alter the distances or spacing between the tube elements, and thus cause disturbances which result in noises. While this difficulty is always more or less present in radio systems, it is particularly noticeable in the case of radio systems for use, for example, with aircraft, since the tubes in such systems are constantly subject to shocks and vibration. It is therefore especially desirable to provide a vacuum device having great strength and rigidity for use in connection with aircraft radio systems, not only to reduce microphonic noises in the systems, for example in a sensitive radio receiver such as is now being used on aircraft, but to reduce or prevent tube breakage therein. Tube breakage in an aircraft radio system may be a very serious matter, since it is often difficult or impossible to replace tubes during flight and the aircraft may consequently be left without means of communication or of finding its course or position.

According to the present invention I overcome the foregoing difficulties and provide a strong and rigid structure and improved connection means by the use of a multi-point support for one or more of the tube elements, and, according to a preferred embodiment, by the use of a three-point support for each tube element, this support taking the form of a three-armed or three-pointed star-shaped press at the top of the tube stem, the arms of this press having the element-supporting wires sealed therein.

Figure 5:
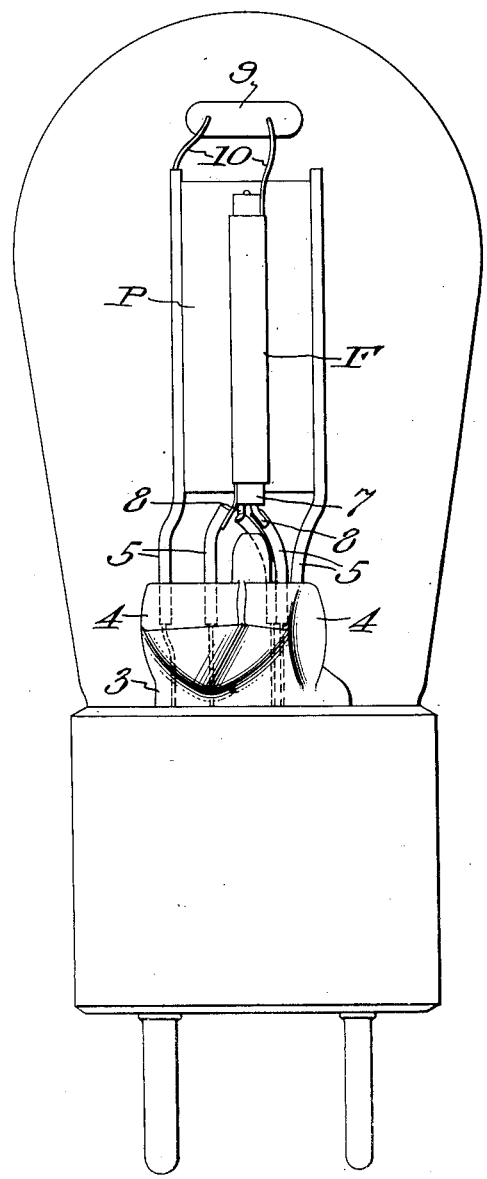
Figure 6:
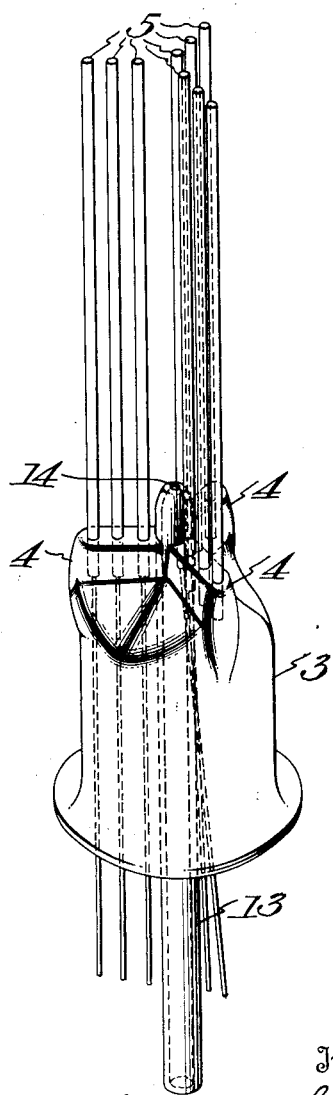

Referring now to the drawings, Figure 1 is a vertical sectional view of a three-element audion tube, or triode, constructed according to the present invention; Figure 2 is a plan view thereof; Figure 3 is a vertical sectional view of a screen-grid four-element or tetrode audion tube according to the present invention; Figure 4 is a plan view thereof; Figure 5 is a vertical sectional view of a two-element rectifier tube constructed according to the present invention; Figure 6 is a partial view showing a tube stem and press with sealed-in supporting wires, and Fig. 7 is an enlarged perspective view, with parts in section, of one form of insulating connector employed between elements of the tube.

In the specific arrangement of Figures 1 and 2, 1 represents a glass bulb or envelope which is sealed at 2, to the cylindrical stem portion 3. The upper portion of this stem is formed into a press comprising three arms, 4, arranged radially approximately 120° apart. The combined lead and support wires, 5, are sealed into each press arm, and one wire is provided in each arm for each element of the tube, whereby each element is supported from the press at three points. Thus the plate, P, is supported from the outer set of wires, 5, the grid, G, from the next or intermediate set, and the cathode, F, from the inner set. In Figures 1 and 2 I have shown a cathode of the alternating current heater type, the electron emitting outer element being shown at 6, and the heater element at 7, provided with heater wires, 8. A glass bead, 9, is arranged at the top of the assembly, and wires, 10, from two or more of the tube elements are sealed therein in order to provide still further rigidity and to maintain a constant distance between elements. Instead of this arrangement, I may employ a disc of insulating material fitting over the supporting wires at either the upper or lower ends thereof, and acting as a spacer therefor. Instead of a "heater" cathode, I may, of course, employ either a direct current or an alternating current filament, in which case two of the support wires are current-carrying connections thereto, and the third may be a mere support, or a combined support and centre tap, for example.

Although it has been customary practice to employ tube elements which are pre-formed and self-sustaining, as illustrated, the fact that the elements are capable of retaining their form under all normal shocks and vibration is not, of itself, sufficient to avoid noisy operation and the possibility of damage when subjected to shocks and vibration unless the elements are so mounted that they cannot vibrate as a unit on their supporting wires. The multiple-point support provided by this invention materially increases the rigidity of the elements.

Figures 3 and 4 illustrate a similar arrangement applied to a four-element tube of the screen-grid type. In this case the plate, P, is supported from the outer set of conductive supporting wires, 5, the screen grid, 3, is supported by a fork, 5', carried by the intermediate set of supporting wires, 5, and the cathode, F, is supported by the inner set of wires. It will be understood, of course, that in each case these supporting wires, 5, or some of them, constitute the conductive connections to the several tube elements supported therefrom. The control grid, G, may, if desired, be supported directly from the press by means of still another set of supporting wires, 5, but I have found it to be of more advantage, in reducing the capacity between grid and plate, to support the control grid from the screen grid by means of the connecting insulators, arranged at top and bottom. These may suitably be constructed of small strips of mica 12, 12 clamped at each end by metal strips 12', which in turn are welded or soldered to the grid and screen-grid, respectively. Further rigidity may be imparted to the assembly by the wires, 10, from the screen grid, S, and cathode, F, sealed into the glass bead, 9. This bead may also have sealed therein the lead wire, 11, from the control grid, G, which is carried out through the envelope at the top as in the usual screen-grid tube construction.

Figure 5 shows a two-element rectifier tube provided with anode, P, and emitting cathode, F. The press and supporting wires are arranged as before and have like reference characters applied thereto.

Figure 6 shows a portion of a tube constructed according to the present invention and having the supporting wires sealed therein ready to be attached to the tube elements. It also shows one arrangement of the evacuating and sealing-off tube, 13, which passes through the top of the stem at 14. After the bulb is evacuated through this tube, it is sealed off and the unnecessary portion thereof removed. This figure also illustrates the method of connection by means of the supporting wires, 5. Since only one connection to each element, except the cathode, is required, not all of the supporting wires are brought through the press, but four or more of them may terminate therein. A further advantage of a three-arm press according to the present invention is that the connection to the anode may be brought through one arm of the press, the connection to the grid (or screen grid) through another arm, and the connections to the cathode (whether two as in the case of an ordinary direct current or alternating current filament or three as in the case of a "heater" cathode) may be brought through the third arm of the press. Thus the connections and leads to these elements are separated and capacities between them are reduced. This is of considerable importance in the construction of audion tubes (whether triodes or tetrodes) for use in connection with radio frequency circuits, since it is necessary to reduce the inter-electrode tube capacities as much as possible in order to reduce undesired capacitive couplings in circuits associated therewith. Especially is this true of the grid-plate capacity of an audion which should be kept as low as possible. The present invention affords a valuable means of reducing this and other capacities between leads inside the tube.

It is to be understood that the foregoing specifically-described constructions and arrangements are merely illustrative examples according to my invention, which is not limited thereto but extends to many modifications and variations thereof.

I claim:

An electron discharge device including a stem having at one end a press with three equally spaced radial arms, a self-supporting electron emitting cathode mounted on and in axial alignment with said stem, a tubular grid mounted coaxial with and surrounding said cathode, a supporting wire projecting vertically from each of said arms at a radial distance from the axis of said stem equal to the radius of said grid and secured to said grid, a second grid of smaller diameter than said first grid, insulating supports connecting said grids for supporting said second grid within said first grid and coaxial with said first grid, a tubular plate coaxial with and surrounding said grids, and a supporting wire projecting vertically from each of said arms at a radial distance from the axis of said stem equal to the radius of said plate and secured to said plate, said supporting wires substantially preventing lateral movement of said grids and plate with respect to said stem.

HAROLD A. SNOW.